United States Patent Office 3,221,831
Patented Dec. 7, 1965

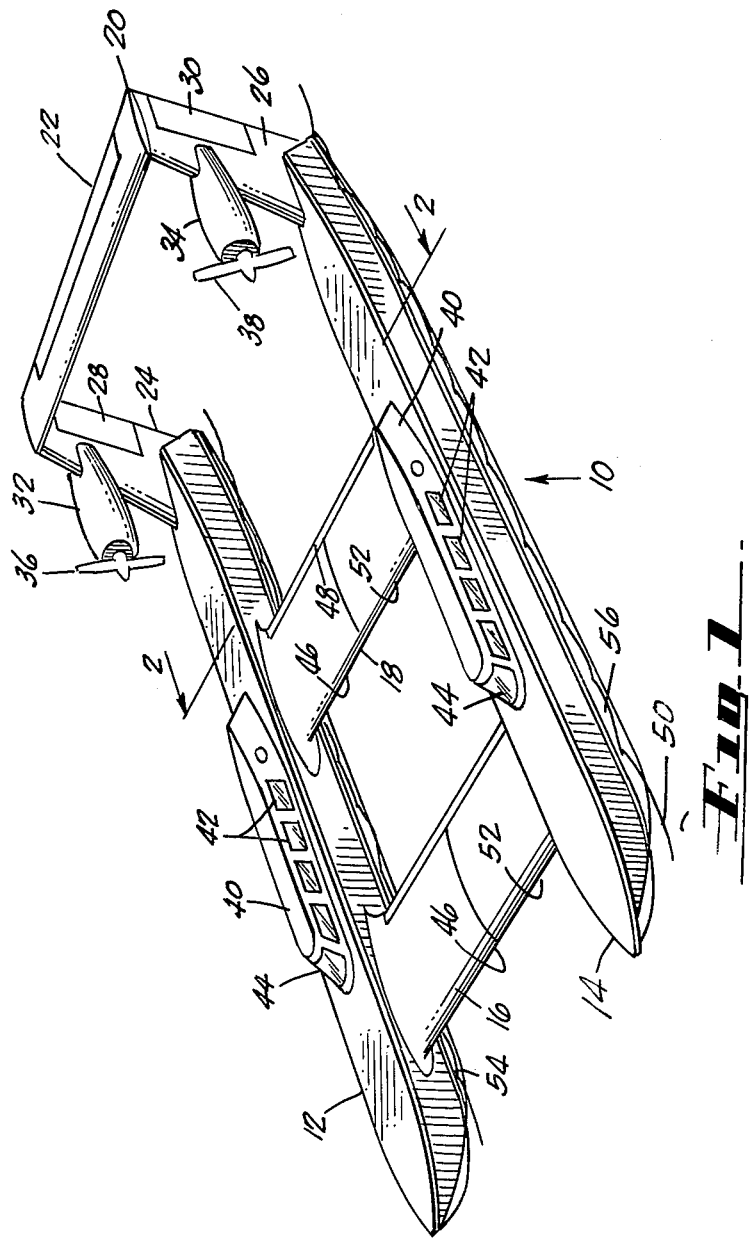

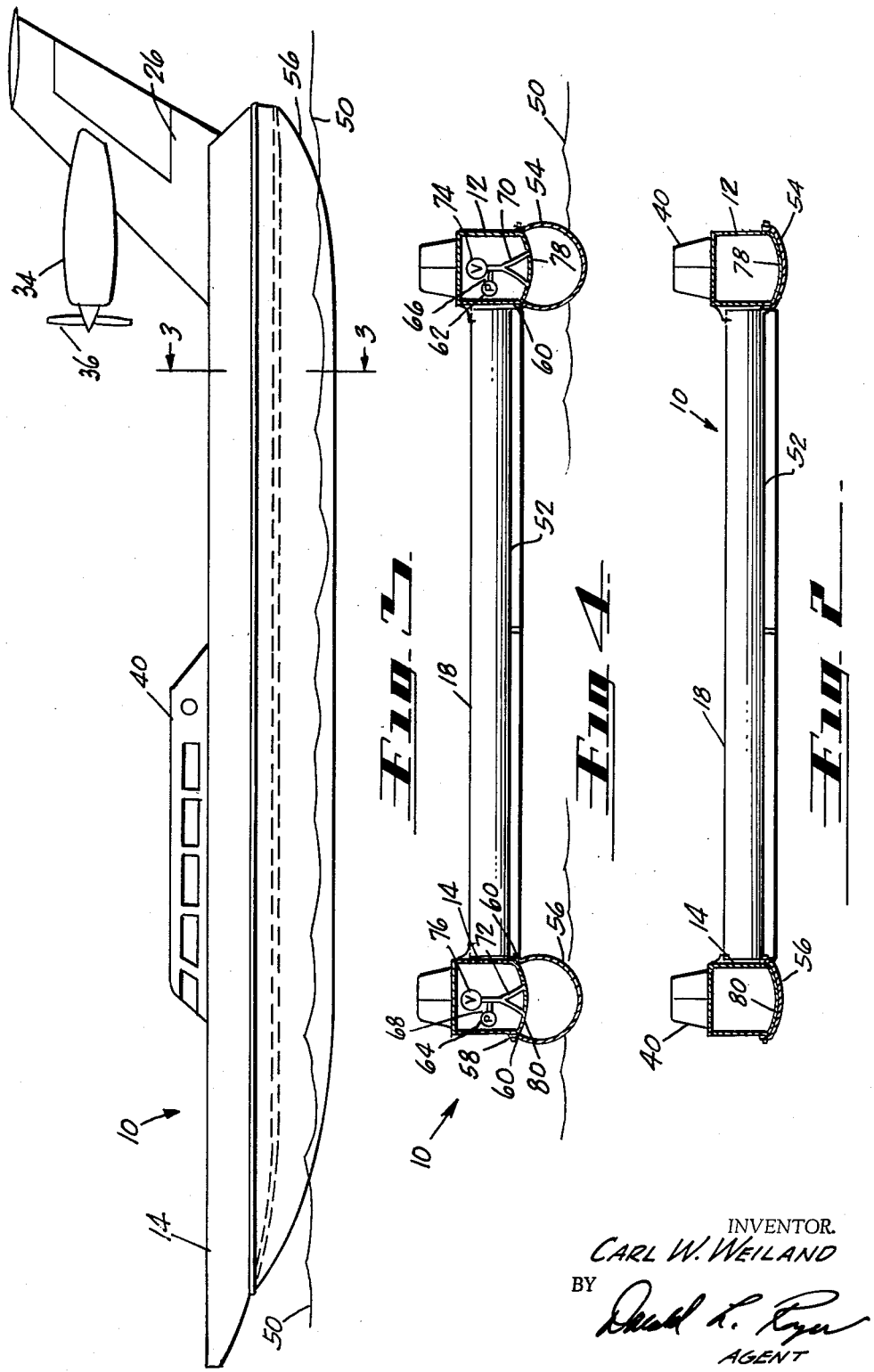

3,221,831
WINGED SURFACE EFFECT VEHICLES
Carl W. Weiland, Palos Verdes, Calif., assignor to Douglas Aircraft Company, Inc., Santa Monica, Calif.
Filed Dec. 13, 1963, Ser. No. 330,330
4 Claims. (Cl. 180—7)

This invention relates generally to fixed-winged type surface effect vehicles and more particularly to means for lifting the wings of an amphibious vehicle above a body of water during taxiing and takeoff.

Surface effect principles have been known for some time and have been demonstrated in a variety of practical utilizations and mechanisms. In fixed wing surface effect vehicles, a lifting cushion is dynamically created beneath a wing by its forward velocity over a surface, such as water. The lifting pressure in the cushion is achieved by the under surface of the wing having a definitely positive angle of attack which effectively funnels or rams a large volume of air into a smaller volume toward the trailing edge of the wing, between the wing and the surface. Efficient flight requires that the wing be as close to the surface as possible. This requires that only a short structure extend below the wing so that the wing may remain close enough to the surface for satisfactory operation during flight while the structure does not contact the surface. When such a vehicle taxies for take-off and takes off from water, it must float far enough above the water that the wings are above any waves that may be encountered during takeoff. This requires a float structure extending below the wings a greater distance than is optimal for flight.

One prior art solution to this problem, was to equip the vehicle with means for effecting a vertical takeoff so that it did not have to be taxied through the water. This added to the cost of the vehicle and made it relatively expensive to operate and maintain.

Accordingly, it is the primary object of the present invention to provide a new and useful surface effect veheicle of the fixed-wing type.

Another object of the present invention is to provide an airborne surface effect vehicle having means to lift the wings, when the vehicle is taxied in a body of water preparatory to taking off, sufficiently above the water that there is no danger that the wings will hit a wave during takeoff.

Still another object of the present invention is to provide an amphibious surface effect vehicle having an inflatable diaphragm stretched across the bottom of the hull thereof which may be inflated before takeoff to lift the wings above the water during takeoff and which may be deflated during flight so that the vehicle may fly close to the water.

A further object of the present invention is to provide a surface effect vehicle of the type described which is, with respect to vertical takeoff types, profoundly simpler and less expensive to build, operate and maintain.

According to one aspect of the invention, a twin hulled vehicle is interconnected symmetrically by fore and aft fixed-wing members and a horizontal stabilizer elevator.

An inflatable diaphragm is attached to the lower portion of each hull. The diaphragms are inflated like a balloon before take-off to raise the vehicle in the water so that the diaphragm acts as a hydrofoil during take-off. The diaphragms are then deflated after take-off and fit tightly against the hull to minimize aerodynamic drag and to permit the wings to be positioned close to the water during flight.

Forward thrust for taxiing and flight is provided by conventional propulsion means. As the forward air speed increases, the wings develop lift due in part to their conventional airfoil effect and due to their positive angle of attack which creates a dynamic supporting air cushion.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of an example of a fixed-wing amphibious surface vehicle constructed in accordance with the principles of the present invention;

FIG. 2 is a horizontal sectional view taken along line 2—2 of FIG. 1 showing the vehicle during flight;

FIG. 3 is an elevational view of the vehicle of FIG. 1 showing the vehicle in a condition for taxiing; and FIG. 4 is a horizontal sectional view taken along line 4—4 of FIG. 3.

Referring to the drawings in more detail, it is stressed that the particulars shown are by way of example and for purposes of illustrative discussion only and are presented in the cause of providing what is believed to be the most useful and readily understood description of the principles and structural concepts of the invention. Specifically the detailed showing is not to be taken as a limitation on the scope of the invention which is defined by the appended claims, forming along with the drawings a part of this specification.

In FIG. 1 a fixed-wing ground effect vehicle 10 is shown which includes a pair of symmetrically disposed streamlined hulls 12 and 14. The hulls are laterally interconnected by a forwardly disposed wing member 16 and an aft wing member 18. A horizontal stabilizer 20 which, in this example, may include a movable horizontal elevator 22 is also interposed laterally between the two hulls 12 and 14 and is shown affixed intermediate the uppermost extremities of a pair of vertical stabilizers 24 and 26 which are each affixed to the rearward end of a respective one of the hulls 12 and 14. The vertical stabilizers 24 and 26 may include movable rudders 28 and 30, respectively.

Forward thrust producing means in the form of conventional engines 32 and 34 with variable pitch propellers 36 and 38 are shown affixed to the rigid portions of the vertical stabilizers 24 and 26, respectively.

One or both of the hulls 12 and 14 may be adapted to carry passengers, crew and/or cargo and may thereby include cabins 40 having appropriate windows 42 and windshields 44.

The wings 16 and 18 are disposed forwardly and aft respectively of the center of gravity of the vehicle 10 and each includes a leading edge 46 and a trailing edge 48. A lifting cushion is dynamically created beneath each wing by its forward velocity over a surface, such as the body of water indicated at 50. The lifting pressure in the cushion is achieved by an under surface 52 of each wing having a definitely positive angle of attack which effectively funnels or rams a large volume of air into a smaller volume toward the trailing edge of each wing, between the wings and the water 50. After the vehicle 10 is airborne, the most efficient flight requires that the wings 16 and 18 be as close to the water 50 as possible. This dictates that the hulls 12 and 14 extend below the wings 16 and 18 only a short distance. During takeoff, however, the vehicle 10 must float far enough above the water that the wings 16 and 18 are above any waves that may be encountered. This is accomplished by inflatable hulls or flexible diaphragms 54 and 56 which are attached to the hulls 12 and 14, respectively, by any suitable means, such as strips of strap material 58 which are attached to the hulls 12 and 14 as by screw 60. The diaphragms 54 and 56 are stretched across the hulls 12 and 14 when deflated, as shown in FIG. 2, so that they present minimum aerodynamic drag during flight. The diaphragms 54 and 56 may be inflated by pumps 62 and 64 which may be mounted in the hulls 12 and 14, respectively. Conduits 66 and 68 connect the pumps 62 and 64 to manifolds 70 and 72 through which air is conveyed to the respective diaphragms 54 and 56 to inflate the diaphragms, as shown in FIG. 4. Valves 74 and 76 are connected to the manifolds 70 and 72 to deflate the diaphragms 54 and 56 once the vehicle 10 is airborne. The diaphragms 54 and 56 are inflated before takeoff to lift the wings 16 and 18 sufficiently above the water 50 so that the wings will not contact waves during takeoff. Once the vehicle 10 is airborne, the valves 74 and 76 are opened to allow the diaphragms 54 and 56 to collapse against bottoms 78 and 80 of the hulls 12 and 14, respectively, where they remain until the vehicle 10 is ready to land.

The diaphragms 54 and 56 are again inflated preparatory to landing and the thrust producers 32 and 34 are slowed whereupon the vehicle 10 settles into the water 50. The diaphragms 54 and 56 may remain inflated so long as the vehicle 10 remains in the water 50.

The inflated diaphragms 54 and 56 flex to absorb shocks when the vehicle 10 hits small waves during takeoff or landing and prevent the shocks from being transmitted to the rest of the vehicle 10. This is similar to the protection offered by balloon tires on an automobile. This flexing action also reduces the power required during takeoff since the entire vehicle is not lifted each time a small wave is encountered. For this purpose, it has been found that a differential pressure of approximately one pound between the interior and exterior of the diaphragms is sufficient.

There has thus been disclosed an example and structural aspects of a fixedwing surface effect vehicle which illustrates the principles and concepts of the present invention and which achieves the objects and exhibits the advantages set forth hereinabove.

I claim:
1. A surface effect vehicle of the character to travel airborne in surface effect over terrain surfaces comprising:
   a streamlined hull;
   a substantially horizontally disposed wing affixed to said hull adjacent the lower portion thereof and having an approximately planar under surface with leading edge and trailing edge regions extending along a major portion of the length of said wing,
   said wing having a definitely position angle of attack, which effectively funnels a large volume of air into a smaller volume toward said trailing edge between said wing and said surface to create a lifting cushion beneath said wing by its forward velocity over said terrain surfaces;
   thrust producer means mounted on said vehicle for creating said forward velocity;
   an inflatable diaphragm connected to the bottom of said hull for lifting said wing above said surface for takeoff of said vehicle, said means being retractable during flight to minimize the distance between said wing and said surface during flight.

2. A surface effect vehicle of the character to travel airborne in surface effect over water comprising:
   a streamlined hull;
   a substantially horizontally disposed wing fixed to the lower portion of said hull and having a leading edge and a trailing edge,
   said wing having a positive angle of attack which funnels a large volume of air into a smaller volume towards said trailing edge of said wing between said wing and said water to create a lifting cushion beneath said wing by its forward velocity over said water;
   thrust producing means mounted on said vehicle for producing forward thrust; and
   an inflatable diaphragm connected to the bottom of said hull, said diaphragm being inflated during takeoff for raising said hull in said water during takeoff, thereby lifting said wing sufficiently above said water that waves in said water will not strike said wing during takeoff,
   said diaphragm being in deflated condition during flight.

3. The invention according to claim 2 wherein a differential pressure across said diaphragm is in the order of one pound per square inch.

4. The invention according to claim 2 wherein said diaphragm extends substantially an entire length of said hull.

References Cited by the Examiner

UNITED STATES PATENTS

| | | | |
|---|---|---|---|
| 1,376,675 | 5/1921 | Casper | 244—13 |
| 1,412,848 | 4/1922 | Dunajeff | 180—7 |
| 2,349,584 | 5/1944 | Arnstein et al. | 114—66.5 |
| 2,656,136 | 10/1953 | Martin | 244—118 |
| 3,070,327 | 12/1962 | Dornier et al. | 180—7 |
| 3,076,204 | 2/1963 | Novak | 114—66.5 |
| 3,082,976 | 3/1963 | Dornier | 180—7 |
| 3,159,361 | 12/1964 | Weiland | 114—66.5 |

FOREIGN PATENTS 825,442  12/1959  Great Britain.

FERGUS S. MIDDLETON, *Primary Examiner.*